Oct. 30, 1962   D. D. COOK   3,060,980
SHEATHING PANEL MANUFACTURE FROM BOARDS
Filed March 16, 1961   3 Sheets-Sheet 1

INVENTOR.
Dale D. Cook
BY
Attys.

Oct. 30, 1962   D. D. COOK   3,060,980
SHEATHING PANEL MANUFACTURE FROM BOARDS
Filed March 16, 1961   3 Sheets-Sheet 2
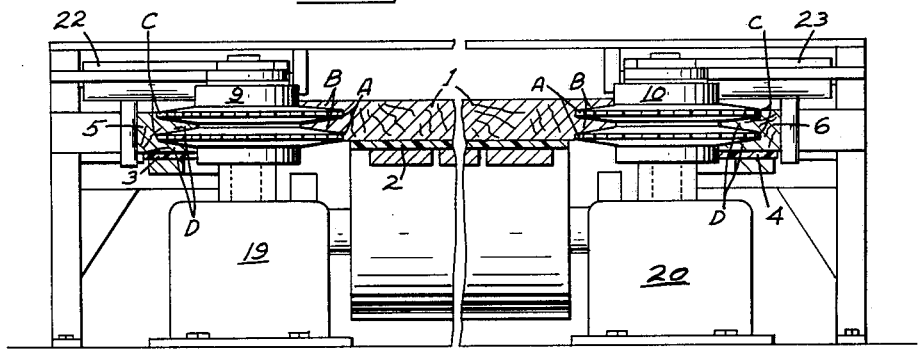
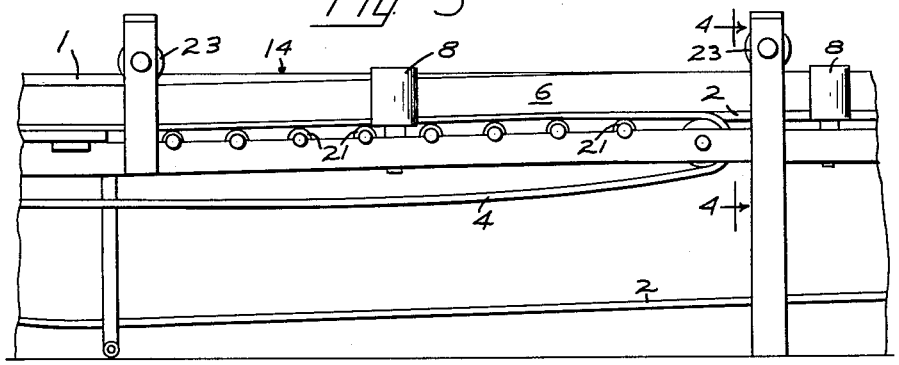
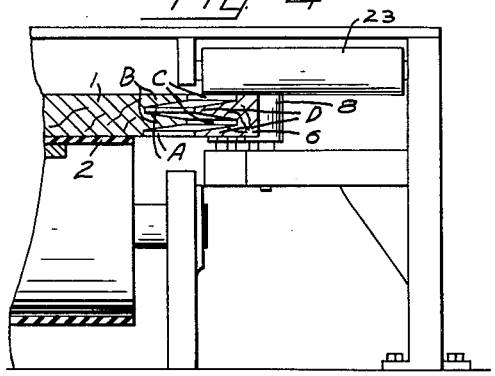
INVENTOR.
Dale D. Cook
BY
Attys.

Oct. 30, 1962 D. D. COOK 3,060,980
SHEATHING PANEL MANUFACTURE FROM BOARDS
Filed March 16, 1961 3 Sheets-Sheet 3

INVENTOR.
Dale D. Cook
BY
Attys.

United States Patent Office 3,060,980
Patented Oct. 30, 1962

3,060,980
SHEATHING PANEL MANUFACTURE FROM BOARDS
Dale D. Cook, Spokane, Wash.
(Box 65, Curlew, Wash.)
Filed Mar. 16, 1961, Ser. No. 96,239
1 Claim. (Cl. 144—3)

My invention relates to the manufacture of a sheathing panel from boards.

It is now common practice to use plywood on rafters, studding and joists as sheathing upon which the finished layer of roofing, siding or flooring is placed. The advantage lies in the large size pieces in which the plywood can be obtained. Although the plywood costs more per square foot, the time saved in laying it up makes it economical to use.

It is the purpose of my invention to provide a panel for sheathing wherein the advantages of the large sheets can be had with a saving in cost over plywood by utilizing short boards of random which have a low value, and assembling these boards with stiles across their ends in a continuous process in such a way that wide panels of any desired length may be had.

According to my invention the boards pre-cut to a desired length, are fed on a conveyor with their side edges abutting each other past a finger jointing cutter head. The boards preferably are edge glued to each other before reaching the cutter head. However, for some purposes the boards may not be edge glued to each other. Companion conveyors at the sides of the board conveyor carry stiles which are elongated wood strips of the same thickness (three-quarter inch for example) as the boards, and which are about one and three eighths inch wide. The stiles are fed end to end by their conveyors and preferably have their ends pre-cut to provide finger joints.

The stile conveyors are offset laterally and vertically with respect to the board conveyor to guide each stile alongside the same finger jointing cutter head that engages the adjacent board end, but with the cutter head between the stile and the board end. The stile conveyors are, at the point where the cutter head is located, offset vertically an amount sufficient to enable the cutter head to cut the fingers on both the board and stile in such position that the fingers on the stile will mesh with the fingers on the board when the bottom faces of the boards and stiles are aligned. Beyond the cutter heads the stile conveyors are sloped upwardly into alignment horizontally with the board conveyor. Glue applicators between the finger jointed ends of the boards and the finger jointed edges of the stiles apply glue to those edges. Beyond the applicators the stile conveyors are provided with guides that move the stiles toward the board ends to force the fingers on the stiles and boards to mesh and to hold them for a period sufficient to set the glue.

The detailed objects and advantages of the invention will appear more fully from the following description and the accompanying drawings.

In the drawings:

FIGURE 2 is a cross sectional view taken on the line 2—2 of FIGURE 1,

FIGURE 3 is an enlarged fragmentary side view showing the parts as viewed from the line 3—3 of FIGURE 1;

FIGURE 4 is a sectional view taken on the line 4—4 of FIGURE 3;

Figure 1:
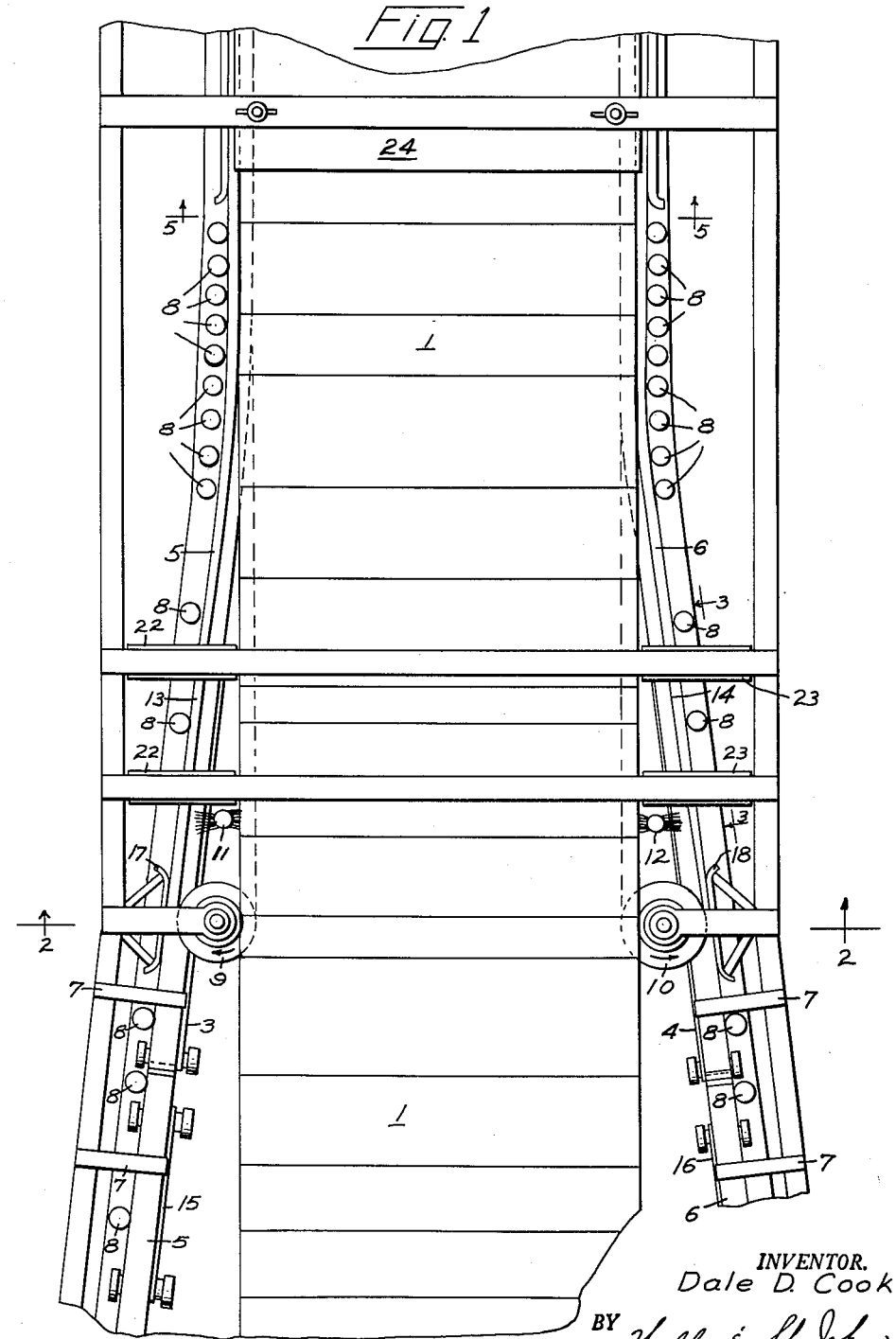
FIGURE 1 is a somewhat diagrammatic plan view of a mechanism for making the sheathing.

Referring now to the drawings, I have shown the assembled short boards 1 as traveling on a conveyor 2 of a conventional type. The boards have previously been edge trimmed and glued to each other edge to edge to form a continuous sheet. Adjacent to the conveyor 2 are two stile conveyors 3 and 4 which convey the stile strips 5 and 6 forward at the same speed that the conveyor 2 advances the continuous sheet of boards 1. These conveyors 3 and 4 are arranged to converge toward the end edges of the boards 1 on the conveyor 2. Guides 7 are provided to keep the stile pieces against the backing rollers 8.

It will be noted from the drawings that the stile conveyors 3 and 4 are positioned slightly below the conveyor 2 from the front or feed end of the machine to the point where FIGURE 2 is taken. A pair of cutter heads 9 and 10 are located at this point and are adapted to cut matching grooves A and fingers B in the adjacent ends of the boards 1 and grooves C and fingers D in the side edges of the stiles 5 and 6. The stiles are held just enough below the board ends that the finger joints are cut in both stiles and the board so that they will interfit when the stiles are raised up to the level of the boards.

Immediately beyond the cutter heads 9 and 10 I place glue applicators 11 and 12. These are shown as spray heads directed against the stiles and the board ends. Any suitable means for applying the glue may be used. Preferably I use a waterproof glue.

Figure 5:
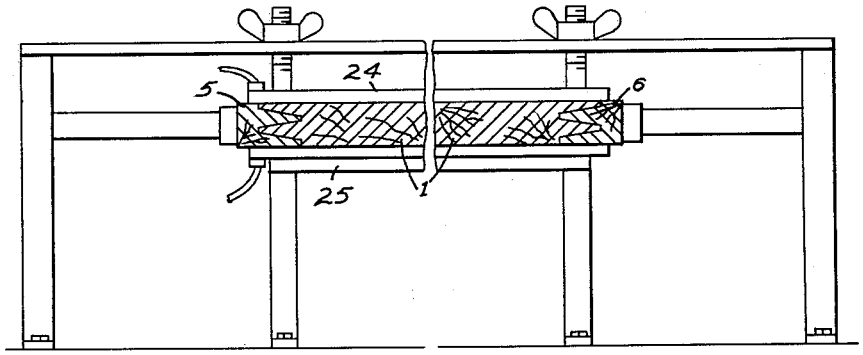
FIGURE 5 is an enlarged sectional view taken on the line 5—5 of FIGURE 1.

The stile conveyors 3 and 4 are inclined upwardly beyond the blue applicators 11 and 12 as indicated at 13 and 14 and bring the stiles 5 and 6 up to the level of the boards 1 before the stiles 5 and 6 come into overlapping relation with the ends of the boards. The stiles bend readily this small amount. The conveyors 3 and 4 force the stiles and board ends into intermeshed relationship as illustrated in FIGURE 5, and hold them until the glue is cured. Any conventional means such as heating, can be used to speed up the glue curing.

The stile strips 5 and 6 are continuous. Suitable lengths of the strips are previously provided with finger joints at the ends and these ends are joined to make a continuous strip prior to the strips reaching the cutter heads 9 and 10. This pre-joining of the stiles is accomplished by providing at 15—16 (FIGURE 1) a speeded up conveyor as a part of each of the conveyors 3 and 4 which section frictionally engages a stile and urges it forward toward the next stile ahead to intermesh the finger jointed ends of the stile strips. The rear end of each stile strip has glue applied to its finger joint surfaces so that when two stile strips are pushed together at 15—16, the end joint is completed and the curing of this end joint occurs when the curing of the adjacent joint between the stile and the board takes place.

The cutter heads are rotated in the directions indicated by the arcuate arrows (FIGURE 1) whereby they tend to advance the stiles as they cut. I have indicated at 17 and 18 backing shoes to hold the stiles 5 and 6 against the cutter heads 9 and 10. The cutter heads are driven by motors 19 and 20 (FIGURE 2). After the stiles leave the spray heads 11 and 12 they are elevated by lower rollers 21 (FIGURE 3) beneath the conveyors 3 and 4. Top rollers 22 and 23 (FIGURES 1 and 4) are provided above the stiles. After the stiles 5 and 6 are brought up to the level of the boards 1 they are forced by closely spaced rollers 8 against the ends of the boards 1. The assembled panel then passes between heated platens 24 and 25 (FIGURE 5) where the adhesive in the finger joints is finally cured.

Figure 6:
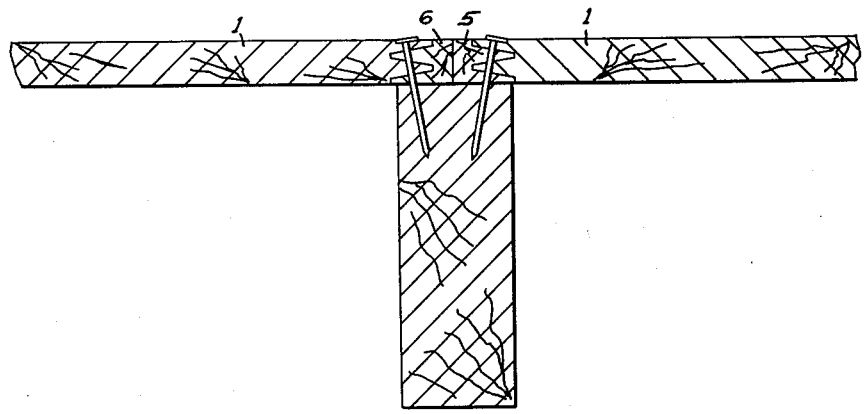
FIGURE 6 is a fragmentary sectional view showing how the finished sheathing is nailed to a supporting framework.

The assembled board-stile panel is cut to the desired length after the glue joints are cured. Since the assembly is delivered as a continuous strip it can be cut into eight foot, ten foot, etc. lengths as desired. In laying these sheathing panels on the frame of a building the nailing is preferably done as shown in FIGURE 6 of the drawing. The overall width of the panel preferably is a multiple of the standard sixteen inch spacing of wood frame members. By making the stile strips one and three-eighths inch wide and using one inch finger joints there is ample room to nail through the joint itself as shown in FIGURE 6. This keeps the stiles and boards from splitting because the nails pass through the portions of the stiles that are glued to the boards. When the boards are edge glued to each other as previously described, and then glued to the stiles, cupping of the boards is essentially avoided.

It is believed that the nature and advantages of my invention will be clear from the foregoing description.

Having described my invention, I claim:

Apparatus for forming continuous lengths of wood panels from short board lengths comprising a conveyor operable to carry the boards edgewise in side by side relation in a horizontal plane, a pair of finger joint forming cutter heads mounted at the sides of said conveyor and positioned in the path of the ends of said boards on the conveyor, power means to drive the cutter heads, a stile strip conveyor means at each side of the conveyor having means thereon to convey stile strips endwise in the same general direction and at substantially the same speed as the first named conveyor, said cutter heads being between the stile strips and the board ends, said stile conveyors being offset vertically with respect to the board conveyor at said cutter heads a distance equal to one half the finger spacing on the cutter heads, and being inclined with respect to the board conveyor both laterally and vertically as they extend beyond the cutter heads to bring the finger jointed stile strips into the same plane as the boards and interengage the fingers and grooves of the board ends and the stiles.

References Cited in the file of this patent
UNITED STATES PATENTS

| | | |
|---|---|---|
| 707,116 | Johnson | Aug. 19, 1902 |
| 1,537,820 | Grunow | May 12, 1925 |
| 2,033,804 | Angremy | Mar. 10, 1936 |

FOREIGN PATENTS

| | | |
|---|---|---|
| 529,269 | France | Dec. 5, 1921 |
| 478,397 | Great Britain | Jan. 18, 1939 |
| 1,017,371 | France | Sept. 17, 1952 |